O. BONNEY, Jr.
Harvester.

No. 95,188.  Patented Sept. 28, 1869.

Witnesses:
T. Smith
S. E. Jones

Inventor:
Olpha Bonney jun.
by Atty Thos. T. Everett

UNITED STATES PATENT OFFICE.

OLPHA BONNEY, JR., OF SAN FRANCISCO, CALIFORNIA.

IMPROVEMENT IN HARVESTERS.

Specification forming part of Letters Patent No. 95,188, dated September 28, 1869.

*To all whom it may concern:*

Be it known that I, OLPHA BONNEY, Jr., of the city of San Francisco, in the State of California, have invented a certain new and useful Improvement on Harvest Helpers or Lifters; and I do hereby declare that the following is a full, clear, and exact description of the construction and operation of the same, reference being had to the accompanying drawings, and to the letters and marks thereon, which said drawings form part of this specification, and show such parts of the helper or lifter as have my present improvement attached thereto.

This invention is of the character of an "additional improvement" to an invention on which Letters Patent were granted to me on the 21st day of July, 1868.

A leading object of the invention covered by the patent here referred to is to elevate the grain in the field from its prostrated condition by the action of heavy winds and rain, and to bring it to a proper position for the action of the knives or cutters of the harvester or header.

The present improvement relates to means for rendering the helper or lifter more efficient, convenient, and useful.

Figure 1:
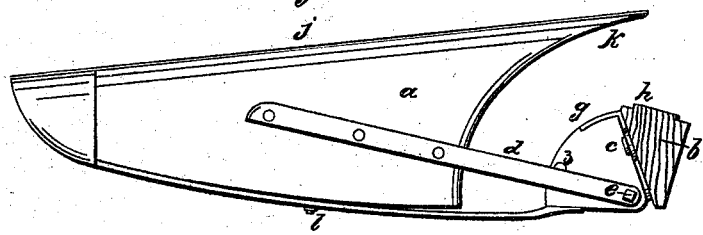
Figure 2:
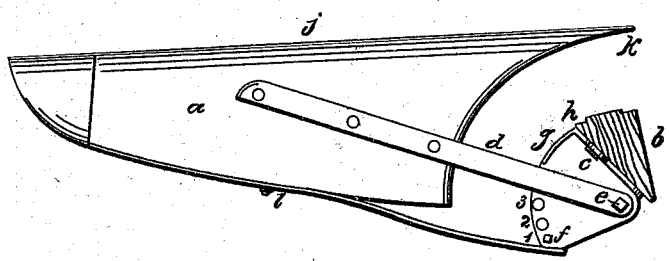

Figure 1 of the drawings of this specification is a side view of a helper with my improvement in the one position, and Fig. 2 a like view of the same in a different position, as will hereinafter be explained.

The same marks and letters are used in both figures to indicate like parts.

The helper or lifter $a$ is connected to the beam $b$ of the header through the interposed metal knee $c$, the arm $d$, which is secured to the helper, being pivoted to the knee $c$ by the bolt $e$.

There are holes, 1 2 3, in the knee, in which the bolt $f$ may be placed, so that the helper may be adjusted and its point raised or lowered. The arm $d$ is forked, so as to be on both sides of the knee.

A rib, $g$, is on the upper part of the knee to prevent the arm $d$ from coming up in contact with the knives of the header, located at $h$.

A metal spring, $i$, is attached to a part of the bottom of the helper, and extends backward, bearing against the bottom surface of the knee. The two different conditions of the spring, with the adjustment of the bar, are shown by the two figures of the drawing. This spring $i$ protects the wood-work of the lower part of the helper, and prevents it becoming rough from wear, gives a smooth surface for entering the grain, and prevents the grain from obstructing the movements of the knee.

The top of the helper is covered by a metal strip, $j$, the edges of which are turned into recesses in the wood part of the helper, and the back end $k$ compressed and tightened down upon the wood. The grain will therefore be raised upon a smooth surface, the use of nails or screws for attaching the strip $j$ being avoided by the turning in of the edges into the recesses.

These improvements on the helper or lifter give it compactness, easy motion on rough or uneven ground, and ready adjustment, allowing the header to cut close to the ground, and varying in height from two to twenty-four inches, as may be desired.

What I claim as an improvement in harvest helpers or lifters, and desire to secure by Letters Patent, is—

The knee $c$, interposed between the beam $b$ and the spring $i$, in combination with the bar $d$ and spring $i$, as and for the purposes set forth.

This specification signed this 7th day of July, 1869.

OLPHA BONNEY, JR.

Witnesses:
   A. HOLMES,
   H. S. TIBBEY.